Dec. 3, 1963    G. H. BROWN    3,113,101
FLUID METERING DEVICE FOR A WATER SOFTENING APPARATUS
Filed June 6, 1960    2 Sheets-Sheet 1
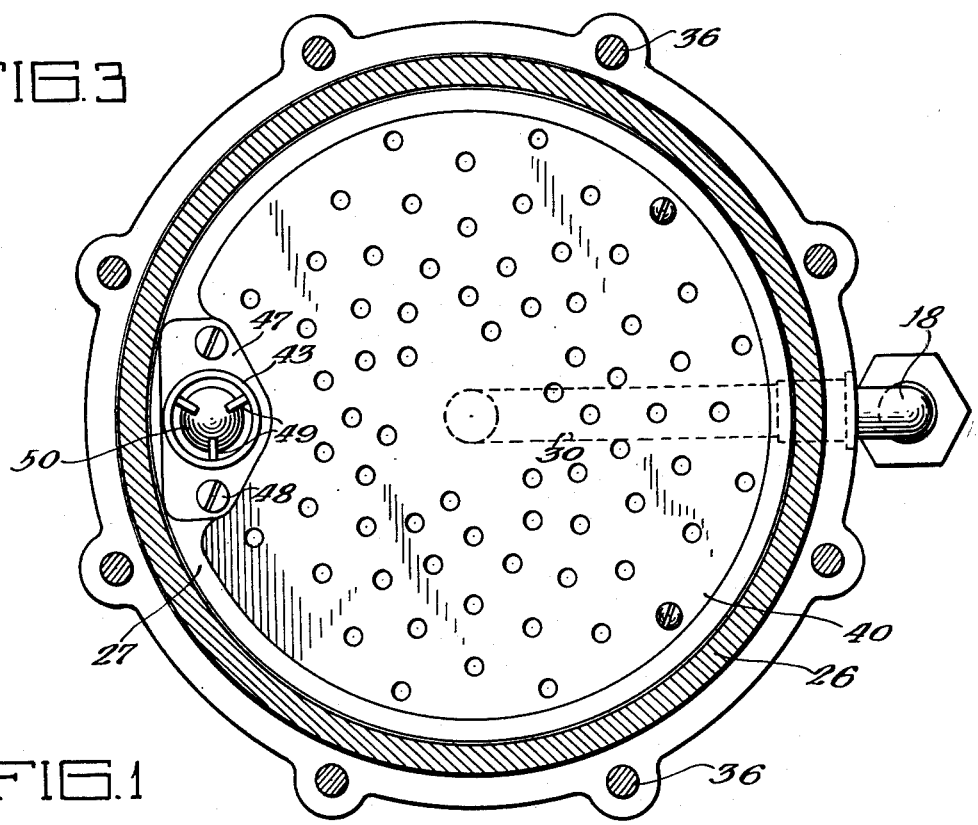
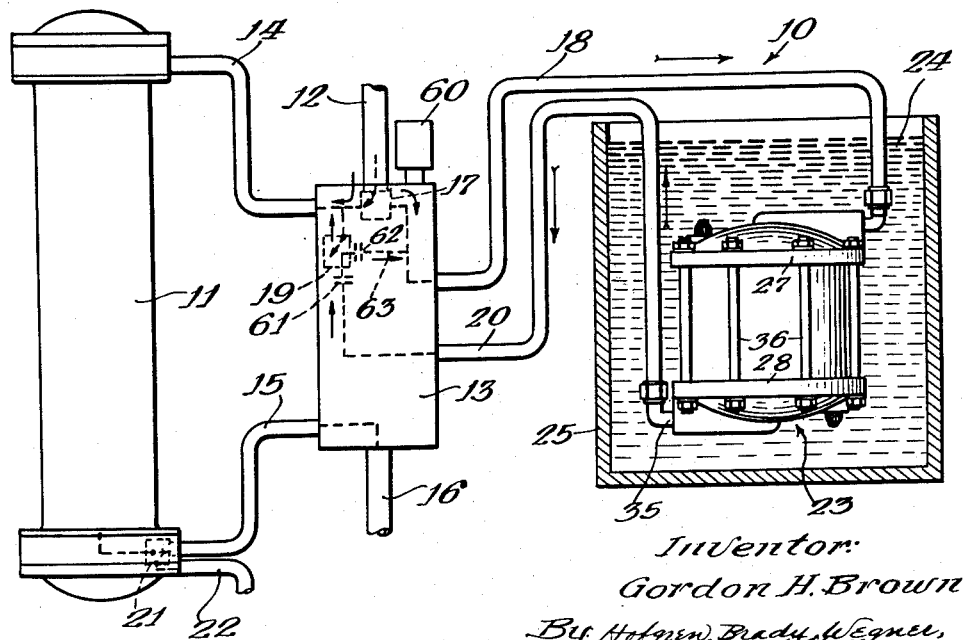
Inventor:
Gordon H. Brown
By Hofgren, Brady, Wegner,
Allen & Stellman
Attorneys

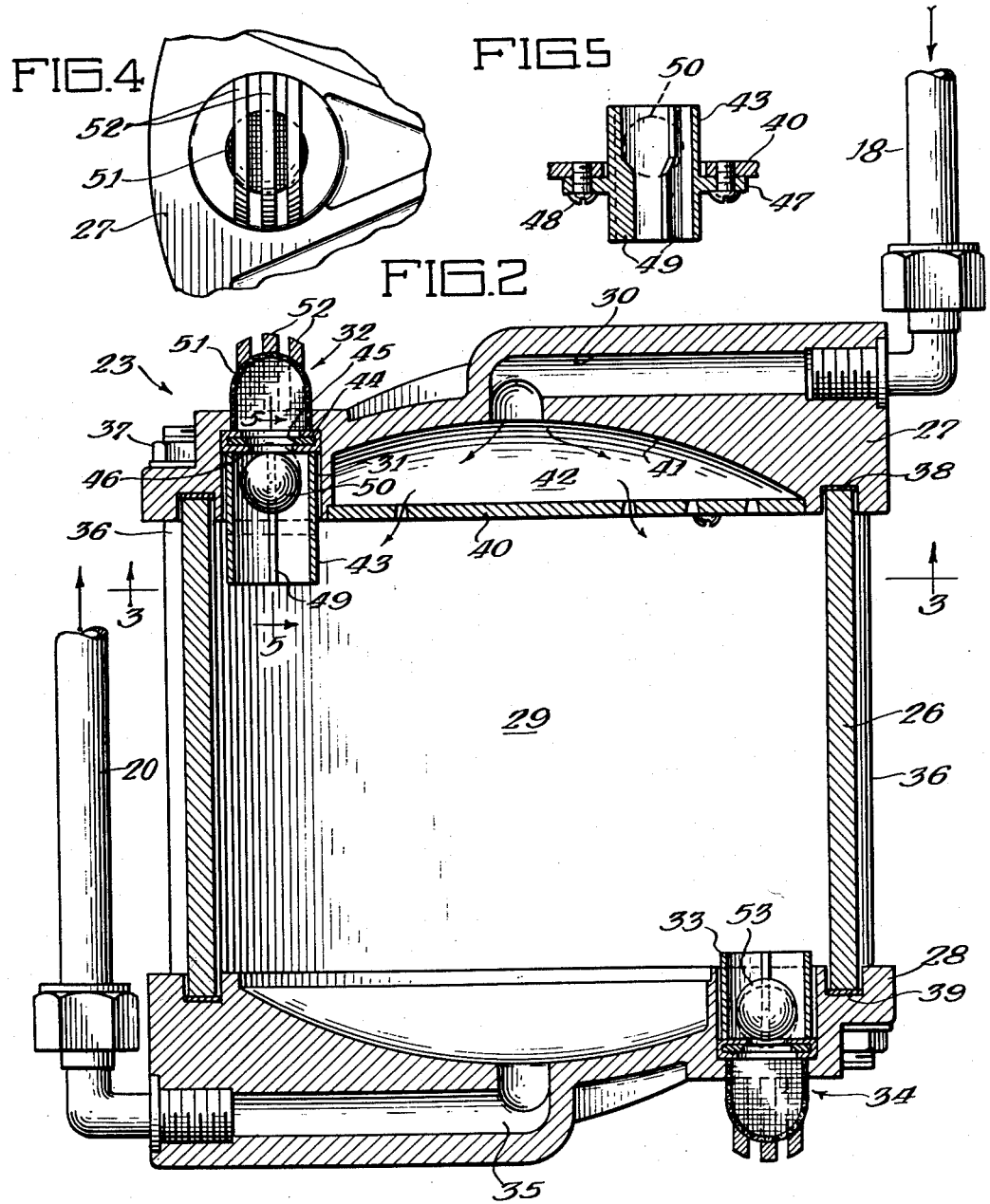

3,113,101
FLUID METERING DEVICE FOR A WATER SOFTENING APPARATUS
Gordon H. Brown, Watervliet, Mich., assignor to Whirlpool Corporation, a corporation of Delaware
Filed June 6, 1960, Ser. No. 34,093
5 Claims. (Cl. 210—98)

This invention relates to water softening apparatus and in particular to fluid metering devices for use in water softening apparatus.

In base exchange type water softening apparatus, the water to be softened is passed through a resin bed wherein an ion exchange occurs. As a result of the softening operation, the resin bed becomes exhausted requiring a regeneration as by passing brine therethrough.

The present invention is concerned with a water softening apparatus including a metering device for use in controlling automatically the regeneration brine delivery. A principal feature, therefore, of the invention is the provision of a new and improved water softening system.

Another feature is the provision of a new and improved fluid metering device for use in a water softening system.

Still another feature of the invention is the provision of such a fluid metering device having an improved simplified and economical construction, eliminating the need for the various valves, eductors or ejectors of known water softening apparatus.

A further feature of the invention is the provision of such a fluid metering device providing an improved continuous and uninterrupted regeneration and rinsing operation in a water softening apparatus.

Still another feature of the invention is the provision of such a fluid metering device including means defining a chamber, means defining a first inlet to the chamber for delivery of water under pressure thereto, means defining a second inlet to the chamber providing communication between the chamber and the space surrounding the chamber containing brine solution, means controlling the second inlet including a valve device responsive to forces exerted by the water in the chamber whenever the water is being delivered to the chamber to close the valve device, while allowing the valve device to be open to provide communication between the water in the chamber and the brine surrounding the device when the water is not being delivered to the chamber, and an outlet from the chamber for delivery of the brine from the chamber as a result of the forces developed by the incoming water, and for delivery of the water subsequent to the delivery of the brine.

A yet further feature of the invention is the provision of such a fluid metering device having new and improved means for causing the incoming water to have a piston-like action in forcing the brine from the chamber through the outlet.

Other features and advantages of the invention will be apparent from the following description taken in connection with the accompanying drawings wherein:

FIGURE 1 is a schematic elevation of a water softening apparatus provided with a fluid metering device embodying the invention.

FIGURE 2 is a vertical diametric section of the fluid metering device.

FIGURE 3 is a horizontal section thereof taken substantially along the line 3—3 of FIGURE 2.

FIGURE 4 is a fragmentary plan view of a portion thereof provided with a brine inlet control device.

FIGURE 5 is a fragmentary vertical section taken substantially along the line 5—5 of FIGURE 2.

FIGURE 6 is an elevation of a modified form of movable valve member.

In the exemplary embodiment of the invention as disclosed in the drawings, a water softening apparatus generally designated 10 includes a mineral tank 11 through which hard water is delivered from a supply conduit 12, a control valve assembly 13 and a conduit 14, to a conduit 15, valve assembly 13, and a conduit 16 for delivery of the softened water as desired. Control valve assembly 13 includes a conventional two-way valve device 17 selectively connecting conduit 12 to conduit 14 and to a conduit 18. The control valve assembly 13 further includes a conventional valve 19 connecting another conduit 20 to conduit 14. Tank 11 includes a two-way valve 21 connecting the tank selectively to conduit 15 and to a drain conduit 22. The operation of valves 17, 19 and 21 is co-ordinated by suitable means (not shown) so that when valve 17 is arranged to connect conduit 12 to conduit 14, valve 21 connects the tank to conduit 15. When valve 17 is arranged to connect conduit 12 to conduit 18, valve 19 is arranged to connect conduit 20 through a first metering orifice 61 to conduit 14 and valve 21 is arranged to connect the tank 11 to drain conduit 22. A second metering orifice 62 is provided in a conduit 63 connected to conduit 18 for delivering water from conduit 18 to valve 19 for mixing with fluid delivered from conduit 20 through first metering orifice 61. The operation of the valve assembly 13 may be substantially controlled by a conventional timer 60. Valve structures and control means of this type are well known to those skilled in the art and no further description need be given herein.

Conduits 18 and 20 are connected to a fluid metering device generally designated 23 which is submerged in a body of brine 24 carried in a suitable tank 25. As will be brought out more fully herefollowing, the metering device functions to measure a predetermined quantity of the brine 24 and deliver it through conduit 20, valve 19 and conduit 14 to the tank 11 for regeneration of the resin bed. The brine is discharged from the tank 11 through valve 21 and drain 22. The fluid metering device is further arranged to follow the regeneration operation automatically with a rinsing of the resin bed by a volume of water delivered from conduit 12 to metering device 23 and delivered from the metering device through conduit 20, valve 19 and conduit 14 to the tank 11. Upon completion of the regeneration and rinse cycles, the valves 17, 19 and 21 are arranged to deliver hard water from conduit 12 to the tank 11 and the softened water from the tank 11 to conduit 16, as before.

Referring now more specifically to FIGURES 2 through 5, metering device 23 comprises a cylindrical enclosure 26 closed at its upper end by a coverplate 27 and at its lower end by a bottom plate 28 to define a chamber 29. Coverplate 27 defines a first inlet 30 to which conduit 18 is suitably connected for delivery of the water from conduit 12 to chamber 29. The coverplate is further provided with a first outlet 31 controlled by a first valve device 32 for providing selective communication between the body of brine 24 exteriorly of the fluid metering device and chamber 29. Bottom plate 28 is provided with a second inlet 33 controlled by a second valve device 34 selectively providing communication between the body of brine 24 and chamber 29. The bottom plate 28 is further provided with a second outlet 35 to which conduit 20 is suitably connected for delivery of fluid from chamber 29 to tank 11 as discussed above. The coverplate 27 and bottom plate 28 are secured across the opposite ends of the cylindrical enclosure 26 by suitable means such as long bolts 36 and nuts 37, the coverplate being sealed to the enclosure by means of an annular ring 38 therebetween and the bottom plate 28 being sealed to the enclosure by a similar sealing ring 39 therebetween.

A foraminous spreader plate 40 is secured to coverplate 27 to extend transversely across chamber 29 adjacent inlet 30. The inner surface 41 of the coverplate 27 confronting the spreader plate 40 is domed to provide an inlet space 42 therebetween permitting the water to flow from inlet 30 uniformly to all portions of the spreader plate 40.

Valve devices 32 and 34 are arranged so that when water is not being delivered to chamber 29 from inlet 30, communication of chamber 29 with the surrounding brine 24 is established whereby chamber 29 is filled with brine solution. The valve devices 32 and 34 are further arranged to close the associated inlets when water is being delivered to chamber 29 from inlet 30. More specifically, the valve devices are responsive to the forces exerted by the water delivered to the chamber 29 to effect such closure of the inlets.

As best seen in FIGURES 2 through 5, valve device 32 includes a housing defined by a tubular body 43 and an end member 44 having a central opening 45 defined by a valve seat 46. Body 43 is secured to the underside of coverplate 27 by means of a laterally projecting flange portion 47 on the body secured to the coverplate by a suitable means such as screws 48 (FIGURE 3). Body 43 further includes three radially inwardly projecting ribs 49 defining a retainer for a ball 50 comprising the movable valve member of the valve device. The ribs are arranged so that when the ball 50 rests on the upper extremity thereof, the ball is spaced below the valve seat 46 thereby effectively opening the outlet 31. Ball 50 is formed of a material such as plastic and preferably has a specific gravity greater than 1.9; herein the ball 50 is formed of Bakelite having a specific gravity of approximately 1.8 to 2.0. As best seen in FIGURES 2 and 4, the upper end of the valve device 45 is defined by a downwardly opening cup-shaped screen 51 engaging the upper surface of end member 44 and retained in place by a plurality of U-shaped bars 52 on coverplate 27.

Valve device 34 is generally similar to valve device 32 except that it is disposed in inlet 33 with its body uppermost and screen lowermost. Ball 53 of valve device 34 is similar to ball 50 of valve device 32 but is formed of a material having a specific gravity less than 1; herein the ball is formed of a plastic having a specific gravity of approximately .75 to .90.

In the water softening operation of apparatus 10, the incoming hard water flows from conduit 12 through valve assembly 13 and conduit 14 to tank 11. The hard water in passing downwardly through the resin bed of tank 11 is softened. The softened water is delivered from the tank through conduit 15 and valve assembly 13 to the delivery conduit 16 for use as desired. After a predetermined quantity of water has been thusly passed through the tank 11 for softening therein, the control valve assembly is operated to backwash the tank 11 as by suitable valves operated by a suitable volume measuring means (not shown) to pass the incoming water in a reverse, or upward, direction through the tank.

The operation of fluid metering device 23 is as follows. Prior to a regeneration cycle of the water softening apparatus, the outlet 31 and inlet 33 are open to provide communication between the brine 24 in tank 25 and chamber 29. This inlet-open arrangement is automatically effected as the relatively large specific gravity of ball 50 causes it to settle downwardly against the ribs 49 maintaining the flow passage 45 open. Reversely, similarly, the low specific gravity of the ball 53 causes it to float upwardly to engage the ribs of the valve device 34 and correspondingly open the flow passage thereof permitting the chamber 29 to become filled with brine from tank 25.

The regeneration cycle is initiated by operating valves 17, 19 and 21, as discussed above, to connect the inlet water conduit 12 through valve 17 and conduit 18 to inlet 30, and tank 11 through conduit 14, valve 19 and conduit 20 to outlet 35 at the same time tank 11 is connected through valve 21 to drain 22. The pressure of the water at inlet 30 causes the water to enter space 42 and pass through foraminous spreader plate 40. The incoming water displaces a first, small portion of the brine in chamber 29 causing it to pass upwardly around ball 50 through outlet 31 and downwardly around ball 53 and outwardly through inlet 34 as well as outwardly through outlet 35. The forces exerted by the brine in passing around the balls 50 and 53 cause the balls to move from their engagement with the ribs 49 into engagement with their corresponding valve seats closing the outlet 31 and inlet 33 and causing all further delivery of the brine from chamber 29 to be through outlet 35. The spreader plate 40 functions to cause the water to form a flat interface with the brine as the water moves downwardly through the chamber 29 to force the brine through outlet 35. Thus, the incoming water acts as a piston in forcing the brine from the fluid metering device, effectively assuring the delivery of substantially the entire volume of brine previously disposed in chamber 29 to tank 11 for regeneration thereof. The brine delivered from fluid metering device 23 through outlet 35 and conduit 20 is diluted at valve 19 by the mixture therewith of fresh water delivered from conduit 18 through conduit 63 and metering orifice 62. The metering orifice 61 is co-ordinated with the metering orifice 62 to provide a preselected dilution whereby the resultant diluted brine delivered to the tank 11 is of the proper strength for regeneration thereof.

When the lower surface of the entering body of water descends to the bottom plate 28, substantially all brine will have been delivered through outlet 35 to the tank. The volume of chamber 29 below plate 40 corresponds accurately to the volume of brine proper to effect complete regeneration of the resin bed of tank 11, thus automatically assuring complete regeneration with only the necessary amount of brine being used.

The flow of water from conduit 12 is continued subsequent to the delivery of the predetermined volume of brine from chamber 29 thereby automatically effecting a rinse cycle wherein the brine is rinsed from the resin bed of tank 11 and discharged through drain 22. Upon completion of the rinse cycle valves 17, 19 and 21 are restored to the arrangement wherein conduit 12 is connected to conduit 14, conduit 20 is disconnected from conduit 14, and tank 11 is connected to conduit 13 for delivery of softened water through conduit 16 as desired.

The entire regeneration and rinse cycle as discussed above may be effected in approximately five minutes with all brine being removed from the apparatus downstream of the outlet 35 within approximately 3¾ minutes. When the flow of water through inlet 30 is discontinued, communication between chamber 29 and the body of brine in tank 25 is automatically restored as ball 50 now sinks in the fresh water within chamber 29 to rest on ribs 49 and ball 53 rises in the water to engage the ribs of valve device 34. As the brine metering device is completely submerged in the brine 24, the relatively dense brine enters chamber 29 through lower inlet 33 causing the relatively light water in chamber 29 to pass outwardly therefrom through upper outlet 31. The fresh water in space 42 is retained therein as a result of the closing of conduit 18 at valve 17, an interface between the brine and water forming at spreader plate 40 and re-establishing the arrangement of the water and brine in chamber 29 for the piston-like action discussed above.

In FIGURE 6 is illustrated a modified form of ball member 54 for use in valve device 32, comprising a plastic ball 55 and a weight 56 comprising a metallic rod depending from ball 55. In addition to providing an effective specific gravity of the desired value in ball member 54, the rod 56 co-operates with the ribs 49 to center the ball 55 accurately relative to the valve seat. In all other respects, the ball member 54 is similar to ball 50.

In illustrating the invention, a single mineral tank 11 has been shown. One or more additional such mineral tanks may be provided in the water softening apparatus as desired, permitting continuous delivery of softened water by switching between the individual tanks, permitting the above-discussed backwash and regeneration cycles to be effected in one tank while maintaining softening operation in the others.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. Water softener apparatus comprising: a softening tank having an inlet and an outlet; a resin bed within said softening tank; a control valve assembly connected to said inlet for receiving and directing incoming hard water into said softening tank during a softening operation; a brine container for receiving a solution of concentrated brine; a closed brine dispenser including top and bottom walls positioned within said brine tank for being immersed in said concentrated brine, said tank having an opening in each of said top and bottom walls; a first conduit interconnected between said control valve assembly and said top wall, a check valve positioned in the opening in said top wall to control the flow of fresh water from said dispenser and including a ball check having a specific gravity greater than 1; a second conduit interconnected between said control valve assembly and said bottom wall; a check valve positioned in the opening in said bottom wall to control the flow of brine into said dispenser and including a ball check having a specific gravity less than 1, whereby a circulation of fresh water and brine takes place between the brine dispenser and brine container through said openings; and means in said control valve assembly for directing incoming hard water into said first conduit to close both of said check valves and dispense brine from within said dispenser into said second conduit and then into said inlet for automatically regenerating and rinsing said resin bed in a continuous and uninterrupted regenerating and rinsing operation.

2. The water softening apparatus of claim 1 further comprising additional means for automatically mixing a portion of the incoming hard water directed to said control valve assembly during said regeneration operation with concentrated brine dispensed through said second conduit so as to dilute said concentrated brine prior to its being directed into said softening tank.

3. The water softening apparatus of claim 2 in which said additional means includes a metering orifice for controlling the rate of flow of incoming hard water fed to said softening tank during said regeneration operation and a metering orifice for controlling the rate of flow of said concentrated brine solution fed to said softening tank during said regeneration operation.

4. A fluid metering device comprising: means defining a chamber having a top and a bottom; means defining a first inlet to said chamber for delivery of a first fluid under pressure thereto; means defining a space exteriorly of the chamber having a second fluid therein; means defining a first outlet from said chamber at the top thereof providing communication between the chamber and said space; first valve means controlling said first outlet including a housing extending upwardly from said chamber means at said first outlet and having a flow passage therethrough defining a first valve seat, and a first ball movably retained in the housing to engage said first valve seat, said first ball having a specific gravity greater than that of the first fluid, said first ball being arranged to close the flow passage when said first fluid is being delivered to the chamber and to be spaced from said first valve seat to open the flow passage when said first fluid is not being delivered to the chamber; means defining a second inlet to said chamber at the bottom thereof providing communication between said chamber and said space for cooperation with said first outlet to replace first fluid in said chamber with second fluid from said space; second valve means controlling said second inlet including a housing extending upwardly into said chamber from said chamber means at said second inlet and having a flow passage therethrough defining a second valve seat, and a second ball movably retained in the housing to engage said second valve seat, said second ball having a specific gravity less than that of said second fluid, said second ball being arranged to close the flow passage of said second inlet when said first fluid is being delivered to the chamber and to be spaced from said second valve seat to open the flow passage when said first fluid is not being delivered to the chamber thereby permitting flow of first fluid outwardly from said chamber through said first outlet and flow of second fluid inwardly from said space to said chamber through said second inlet; and a second outlet from said chamber spaced from said first inlet for delivery of fluid from said chamber as a result of the delivery of said first fluid to said chamber and said closing of the valves thereby.

5. A fluid metering device comprising: means defining a chamber having a top and a bottom; means defining a first inlet to said chamber at said top thereof for delivery of a first fluid under pressure thereto; means defining a space exteriorly of the chamber having a second fluid therein; means defining a first outlet from said chamber at said top thereof providing communication between the chamber and said space for discharging said first fluid from said chamber; first valve means controlling said first outlet including a housing extending upwardly from said chamber means at said first outlet and having a flow passage therethrough defining a first valve seat, and a first ball movably retained in the housing to engage said first valve seat, said first ball having a specific gravity greater than that of the first fluid, said first ball being arranged to close the flow passage when said first fluid is being delivered to the chamber and to be spaced from said first valve seat to open the flow passage when said first fluid is not being delivered to the chamber; means defining a second inlet to said chamber at said bottom thereof for providing communication between said chamber and said space; second valve means controlling said second inlet including a housing extending upwardly into said chamber from said chamber means at said second inlet and having a flow passage therethrough defining a second valve seat, and a second ball movably retained in the housing to engage said second valve seat, said second ball having a specific gravity less than that of said second fluid, said second ball being arranged to close the flow passage of said second inlet when said first fluid is being delivered to the chamber and to be spaced from said second valve seat to open the flow passage when said first fluid is not being delivered to the chamber thereby permitting flow of first fluid outwardly from said chamber through said first outlet and flow of said fluid inwardly from said space to said chamber through said second inlet; a foraminous plate extending across the chamber in the upper portion thereof for causing the first fluid entering the chamber to form a substantially flat interface with the fluid already in the chamber and act substantially as a piston in urging the fluid downwardly through the chamber; and a second outlet from said chamber at the bottom of said chamber for discharging said second fluid from said chamber as a result of the delivery of said first fluid to said chamber and said closing of the valves thereby.

References Cited in the file of this patent

UNITED STATES PATENTS

| | | |
|---|---|---|
| 1,147,702 | Bower | July 27, 1915 |
| 1,693,829 | Sweeney | Dec. 4, 1928 |
| 2,744,867 | Webb | May 8, 1956 |
| 2,988,107 | Rudelick | June 13, 1961 |